9042X
P. CLARK.
Cultivator-Teeth.
Patented Aug 20, 1835.
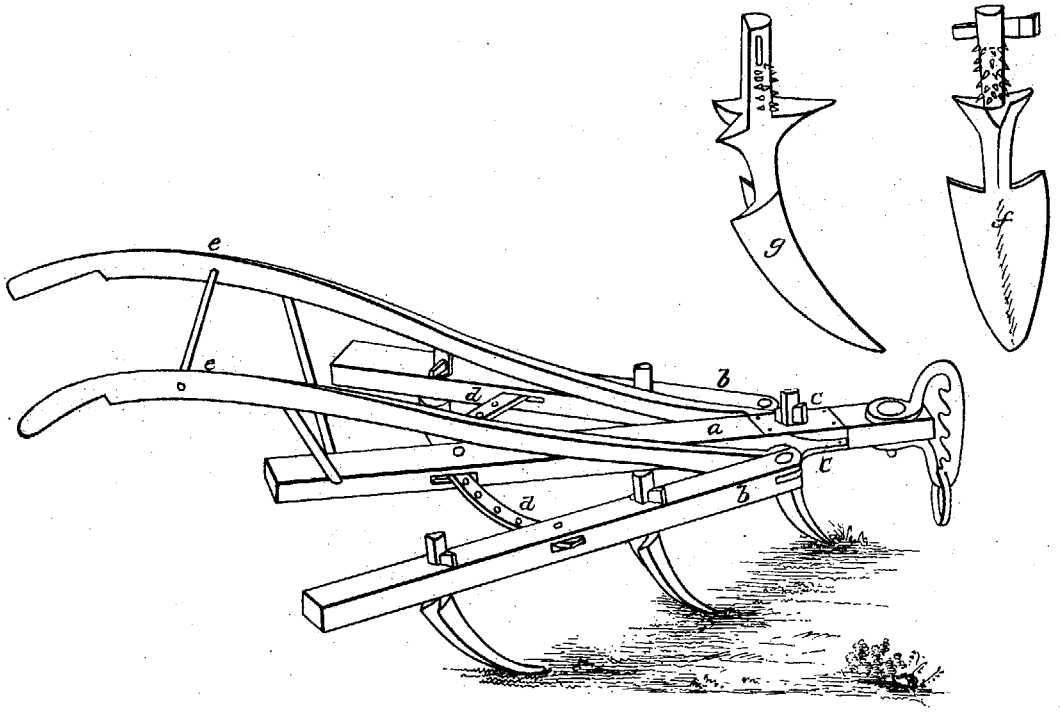
AM. PHOTO-LITHO. CO. N.Y. (OSBORNE'S PROCESS.)

Peter Clark Aurora N.Y.

Letters Patent

The Schedule referred to in these Letters Patent and making part of the same containing a description in the words of the said Peter Clark himself of his improvement in the Corn Harrow and grain Cultivator To all to whom these presents shall come Be it known that I Peter Clark of Aurora Erie County and State of New York have invented a new and useful improvement in the Cultivator for agricultural purposes and that the following is a full and exact description of the Construction and operation of the said Machine as invented or improved by me.

The frame of the Cultivator consists of three bars of wood of suitable dimensions the central one projecting forward of the side bars and having firmly rivetted to its opposite sides two trans-verse plates of iron about ~~about~~ twelve inches from its fore end which extends lat-erally far enough to receive the ends of the side bars which are secured by bolts in such manner as to permit them to turn upon them as the Cultivator is expanded or contracted. The expansion of the Cultivator is regulated by two wood or iron arms which turn at their outer ends upon bolts passing through circular mortices cut into the side bars near their ~~their~~ centres into which the arms are inserted and the inner ends being halved together fly in a groove in a mortice cut horizontally through the central bar and are fastened at different points along the bar by means of an iron pin. The arms or handles are fastened at the fore end by bolts passing down through said transverse plates of iron and extending backward and upward are sustained by means of stanchions resting on the central bar - the teeth may be steel wrought or cast iron and to a front view the cutting part present an oval figure with a sharp edge along the centre, the two adjacent sides of them are nearly right angular to each other and raised laterally the teeth are hooked gradually [illegible] from the point towards the shoulder.

On the back side it is cut by a deep right angular groove to [illegible] the [illegible] there and [illegible] to cutting the neck or throat of the tooth is nearly round having a segment cut from the back side by a proper circular plane and is made rough on the convex surface so as to admit and adhere more firmly to the surface of the hole into which it is inserted. It is also secured by a shoulder projecting forward underneath the bar and by two other triangular shoulders jutting backward and laterally nearly at right angles to each other and also by an iron or wooden wedge being driven down in the back side of the throat of the tooth or by a key inserted through a hole near the top of the throat on the upper side of the bar. The Cultivator has the common clevis in the fore end by which its cutting may be regulated by means of ratches or indentations made in the same. and it may have five or seven teeth one inserted near the fore end of the central bar and the others opposite and equidistant along the side bars and may be used in cultivating all kinds of grain beans potatoes tobacco cotton and the sugar cane. The improvement hereby sought to be secured consists in the peculiar formation of the tooth without a plunge the mode of fastening it and giving it a forward direction suited to the gradual width of the horizon and the method of graduating the same Witnesses B. H. Mosell James Brown Peter Clark Exd

W.G.C

[675 w 8]